(12) United States Patent
Martinot-Lagarde et al.

(10) Patent No.: US 8,405,591 B2
(45) Date of Patent: Mar. 26, 2013

(54) LIQUID CRYSTAL DISPLAY DEVICE WITH IMPROVED SWITCHING MEANS

(75) Inventors: Philippe Martinot-Lagarde, Marcoussis (FR); Stéphane Joly, Saint Saturnin (FR); Jean Denis Laffitte, Leuville sur Orge (FR)

(73) Assignee: Nemoptic, Magny les Hameaux (FR)

( * ) Notice: Subject to any disclaimer, the term of this patent is extended or adjusted under 35 U.S.C. 154(b) by 810 days.

(21) Appl. No.: 12/527,416

(22) PCT Filed: Feb. 20, 2008

(86) PCT No.: PCT/EP2008/052080
§ 371 (c)(1),
(2), (4) Date: Aug. 14, 2009

(87) PCT Pub. No.: WO2008/101967
PCT Pub. Date: Aug. 28, 2008

(65) Prior Publication Data
US 2010/0007652 A1  Jan. 14, 2010

(30) Foreign Application Priority Data

Feb. 21, 2007  (FR) ....................................... 07 53398
Mar. 2, 2007  (FR) ....................................... 07 53626

(51) Int. Cl.
*G09G 3/36*  (2006.01)
(52) U.S. Cl. ............................................ 345/90; 345/87
(58) Field of Classification Search ............. 345/87–104
See application file for complete search history.

(56) References Cited

U.S. PATENT DOCUMENTS 4,870,398 A * 9/1989 Bos .................................. 345/97
5,448,383 A * 9/1995 Kanbe et al. ..................... 349/34
(Continued)

FOREIGN PATENT DOCUMENTS

FR  2 874 446 A1  2/2006
FR  2 874 447 A1  2/2006
(Continued)

OTHER PUBLICATIONS

Dozov, I., et al., "Nemoptic's Bistable Nematic Liquid-Crystal Technology," Information Display (Jan. 2002) pp. 10-12.

*Primary Examiner* — Alexander Eisen
*Assistant Examiner* — Nelson Lam
(74) *Attorney, Agent, or Firm* — Blakely, Sokoloff, Taylor & Zafman

(57) ABSTRACT

The invention relates to a method for controlling a liquid crystal display, comprising a matrix of pixels arranged in crossed lines and columns and in which a switch in the state of the liquid crystal molecules, controlled by application of an electric control signal between two electrodes (50, 52) enclosing each pixel, which brings about a flow in a given direction (18), the pixel addressing being carried out by a line by line addressing either in a single step or in two steps, the first step comprising a collective addressing of at least a part of the screen in a given single texture, followed by a second step of line by line addressing, characterized in comprising, for controlling the switching of at least some of the pixels (P), a step for application to at least one adjacent pixel (58) of auxiliary electric signals wherein, depending on the direction of flow of the pixel (P) the switching of which is to be controlled, the rising or falling fronts of the auxiliary signals are temporally advanced in relation to or simultaneous with the active falling front of the electric control signal with a time offset of between 0 and several tens of microseconds at ambient temperature, such as to promote the switching of said pixel (P) for control, said auxiliary electric signals being applied in the second step when the addressing is in two steps. The invention further relates to a display.

12 Claims, 12 Drawing Sheets

U.S. PATENT DOCUMENTS

Figure 1:
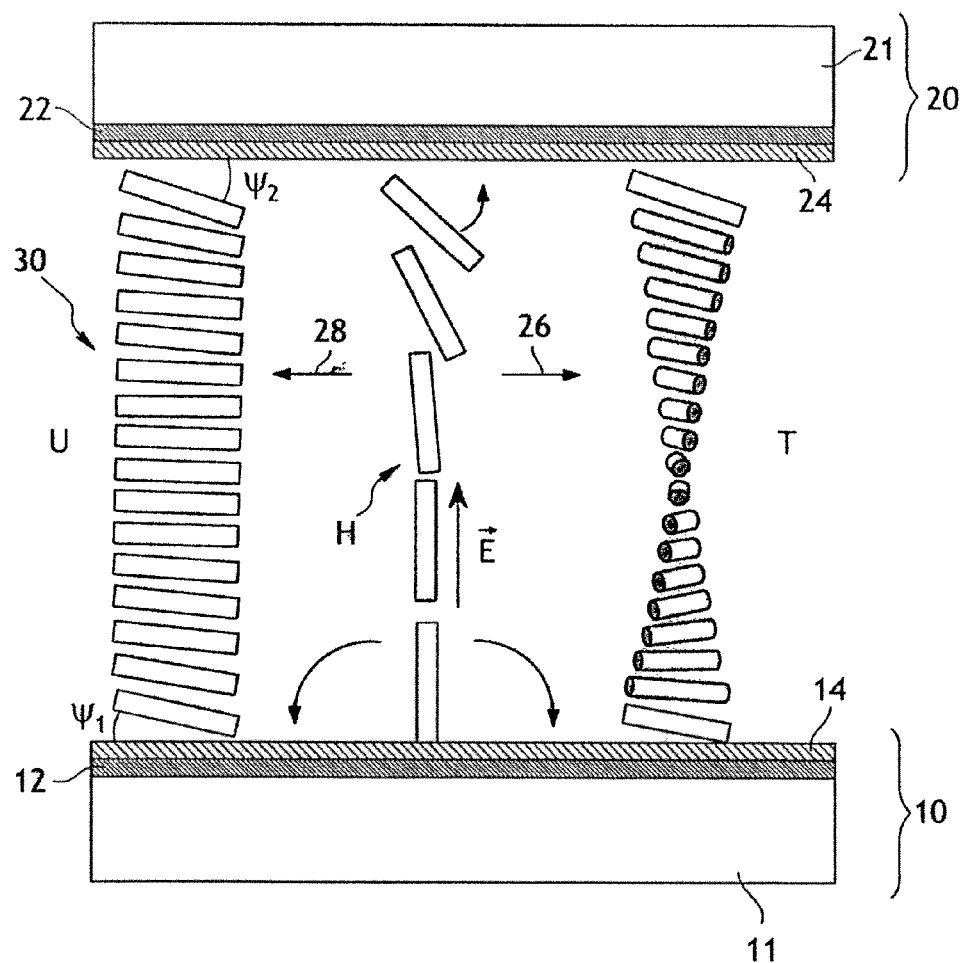

| | | | |
|---|---|---|---|
| 5,900,852 A * | 5/1999 | Tanaka et al. | 345/87 |
| 6,327,017 B2 | 12/2001 | Barberi et al. | |
| 7,067,180 B2 | 6/2006 | Lamarque-Forget et al. | |
| 2003/0156090 A1 * | 8/2003 | Munn et al. | 345/97 |
| 2006/0022919 A1 | 2/2006 | Martinot-Lagarde et al. | |
| 2006/0164351 A1 * | 7/2006 | Hsu et al. | 345/87 |
| 2007/0132685 A1 * | 6/2007 | Jones | 345/87 |

FOREIGN PATENT DOCUMENTS

| | | |
|---|---|---|
| WO | WO 03/090197 A1 | 10/2003 |
| WO | WO 2004/104980 A2 | 12/2004 |

* cited by examiner

LIQUID CRYSTAL DISPLAY DEVICE WITH IMPROVED SWITCHING MEANS

This is a non-provisional application claiming the benefit of International application number PCT/EP2008/052080 filed Feb. 20, 2008.

TECHNICAL DOMAIN

This present invention relates the field of liquid crystal displays.

More precisely, this present invention concerns nematic bistable liquid crystal displays. It applies in particular to nematic bistable liquid crystal displays of which two stable textures differ by a twist of about 180°.

AIM OF THE INVENTION

The aim of this present invention is to improve the performance of the bistable display devices. In particular the objective of the invention is to improve, by the use of new means, the switching of states at the edges of the pixels.

PRIOR ART

Conventional LCD Displays

The most widespread liquid crystal displays use a liquid crystal of the nematic type. They are composed of a liquid crystal layer placed between two plates. Each plate includes a substrate, often made of glass, on which has been deposited a conducting electrode and then a so-called anchor layer also called an alignment layer. The anchor layer exerts, on the adjacent liquid crystal molecules, a return torque which tends to orientate the molecules parallel to a direction called the easy axis. The anchor layers are often implemented by a deposit of brushed polymer to create the direction of the easy axis. The latter is most often very close to the brushing direction.

The thickness of the cell thus constituted is rendered constant by distributing, between the plates, balls whereof the diameter is equal to the desired thickness (typically 1 to 6 µm).

Most of the liquid-crystal based devices proposed and manufactured at present are monostable. In the absence of an electrical field, the liquid crystal is oriented in accordance with a single texture. This corresponds to an absolute minimum of the elastic energy of the liquid crystal in the cell, given the anchorages on the two plates. Under an electrical field, this texture is deformed continuously and its optical properties vary as a function of the voltage applied. Near the plates, the anchor layers known as "strong anchor layers" maintain the direction of the molecules. Their direction varies little. On removal of the field, the nematic is returned by the anchorages onto the two plates. It comes back to a stable texture. The device is monostable. Those skilled in the art will recognise the operating method of the most widespread nematic displays, namely twisted nematics (TN), super-twisted nematics (STN), electrically controlled birefringent (ECB), vertically-aligned nematics (VAN), etc. Regarding addressing, these displays can be addressed directly (very low resolution), in multiplexed mode (medium resolution) or in active mode (high resolution).

State of the BiNem Technology

A new generation of nematic displays, known as "bistables", has appeared over the last few years. These work by switching between two states, and are stable in the absence of an electrical field. The external electrical field is applied only during the time necessary to switch the texture of the liquid crystal from one state to the other. In the absence of an electrical control signal, the display remains in the state attained. By virtue of its operating principle, this type of display consumes energy in proportion to the number of image changes. Thus, when the frequency of these changes reduces, the power necessary for the operation of the display tends toward zero.

Principle of Operation

The bistable display known as the BINEM ([I], [2]) is presented diagrammatically in FIG. 1. It uses two textures, one of which is uniform or slightly twisted (U) (illustrated on the left of FIG. 1) in which the molecules are substantially parallel to each other, and the other (T) (illustrated on the right of FIG. 1) which differs from the first by a twist of about ±180°, to within ±15°. The liquid crystal layer 30 is placed between two plates 20 and 10, which we will call the master plate and the slave plate. The master plate 20 includes a substrate 21, an electrode 22 and a anchor layer 24, creating a strong azimuthal and zenithal anchoring of the liquid crystal, with a "pre-tilt" relative to the surface of the plate 20, whereof the value $\psi_2$ is conventional and close to 5°. The slave plate 10 includes a substrate 11, an electrode 12 and an anchor layer 14, to create a weak zenithal anchoring and a medium or strong azimuthal anchoring of the liquid crystal, and a very small "pre-tilt" ($\psi_1 \ll 1°$ [3], [8]). The two pre-tilts $\psi_1, \psi_2$ are in the same direction, meaning that, in the U texture, the liquid crystal molecules remain tilted with the same tilt sign over the full thickness of the cell. The usually transparent electrodes 12 and 22 deposited on the substrates 11 and 21 are used to apply a perpendicular electrical field to the plates 10 and 20.

The addition of polarisers to each of the substrates 11 and 21 on the outside of the cell, allows an optical state to be associated with each texture, such as dark for U and light for T, or vice-versa, depending on the angles of the two polarisers relative to the anchorage directions.

The nematic is chiralised with a spontaneous pitch $p_0$, chosen to be close to four times the thickness d of the cell, in order to equalise the energies of the aforementioned two textures. The ratio between the thickness d of the cell and the spontaneous pitch $p_0$, namely $d/p_0$, is therefore about equal to 0.25±0.1. With no field, the states T and U are the minimal energy states, and the cell is bistable.

Under a strong electrical field, an almost homeotropic texture, denoted H and illustrated in the middle of FIG. 1, is obtained. In the vicinity of the surface of the slave plate 10, the molecules are perpendicular to it, the anchorage is said to be "broken". The break voltage is denoted as $V_{brk}$, which is the voltage corresponding to the breaking of the anchorage on the slave plate 10. On removal of the electrical field, the cell evolves to one or other of the bistable textures U and T (see FIG. 1). When the control signals employed induce a strong flow of the liquid crystal in the vicinity of the master plate 20, the hydrodynamic coupling 26 between the master plate 20 and the slave plate 10 induces texture T. On the other hand, texture U is obtained by elastic coupling 28 between the two plates 10 and 20, aided by the slight tilt of the weak anchorage [1], [2].

In what follows, by the "switching" of a BiNem screen element, we will be referring to the fact of passing the molecules of the liquid crystal through the homeotropic state H (breakage of the anchorage), and then allowing it to evolve, on removal of the electrical field, to one of the two bistable textures U or T or to a coexistence of these textures. The switch-off of the electrical field corresponds to a falling edge of the voltage applied (reduction of the voltage in absolute value), which will be called the active falling edge when this falling edge is the one which is used, depending on its characteristics, to choose the final state in terms of texture (the pixel voltage can be multilevel [6], and only one of the falling edges is the active edge).

Figure 2:
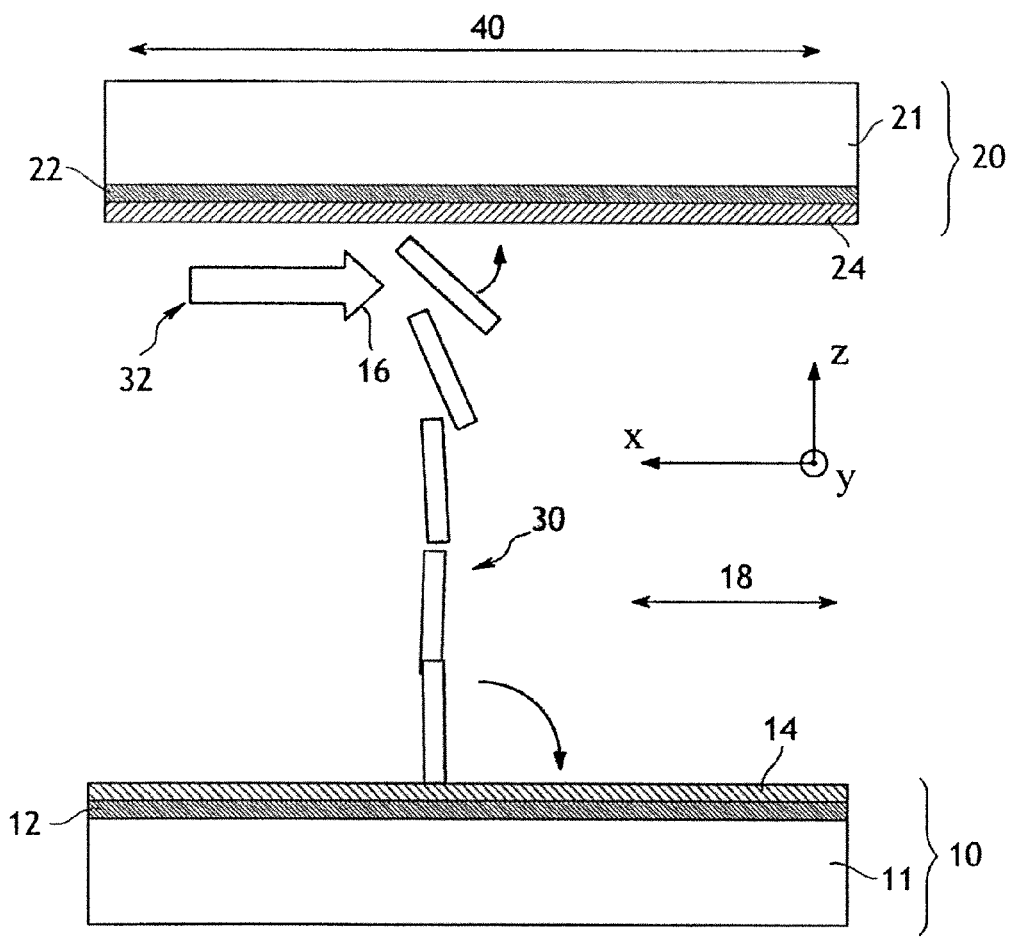

The hydrodynamic coupling [4] between slave plate 10 and master plate 20 is linked to the viscosity of the liquid crystal. On switch-off of the electrical field applied to the zone concerned, the return to equilibrium by the molecules anchored on the master plate 20 creates a falling flow 32 near the master plate 20, where the direction 16 is indicated in FIG. 2. The viscosity causes the falling flow 32 to diffuse throughout the thickness of the cell in less than one microsecond. If the falling flow 32 is strong enough near the slave plate 10, it tilts the molecules there in the direction which induces texture T. The molecules turn in opposite directions on the two plates 10 and 20. The return to equilibrium by the molecules near the slave plate 10 is a second engine for the flow, reinforcing it and helping with the homogeneous passage of the pixel to texture T. Thus the passage of the texture under field H to texture T is attained by virtue of the falling flow 32, and therefore the movement of the liquid crystal in the direction 16 in which the anchorage of the molecules on the master plate 20 is tilted (see FIG. 2), according to direction 18. This direction 18 of the falling flow close to the master plate is substantially parallel to the brushing direction of its alignment layer, which is referenced 40 in FIG. 2 cannot be strictly parallel to it, due to the twist in the starting texture for example. Typically, it is parallel to it to within about ±10°.

The elastic coupling between the two plates 10, 20 gives a very slight tilt to the molecules near the slave plate 10, into texture H under the field, although the applied field tends to orientate them perpendicularly to the plates. In fact the strong tilted anchorage on the master plate 20 maintains a tilt on the adjacent molecules. The tilt near the master plate 20 is transmitted by the orientation elasticity of the liquid crystal up to the slave plate 10. On the slave plate 10, the anchorage and any tilt of the easy axis of the latter amplify the tilt of the molecules [5]. When, on removal of the field, the hydrodynamic coupling is insufficient to combat the residual tilt in the molecules near the slave plate 10, then the molecules near the two plates 10 and 20 come back to equilibrium by turning in the same direction, and texture U is obtained. These two rotations are simultaneous, and they induce flows in opposite directions which oppose each other. The total flow is practically zero. There is therefore very little overall movement of the liquid crystal during the passage from texture H to texture U.

The switching to U or to T of the pixel is a function of the intensity of the falling flow 32 created by the master plate 20. This flow diffuses to the slave plate 10, and the intensity of the flow obtained in the vicinity of the slave plate 10 determines the final texture obtained (U or T). In order to obtain a large falling flow 32 which will induce texture T, it is necessary to apply a pulse of electrical field with a steep-edged descent, such as a signal of the slot type for example. In order to obtain texture U, a pulse of electrical field with a slow-sided descent, generating a very weak falling flow, is necessary, such as a steadily falling slope for example or one in successive steps between the levels [1], [2], [6].

It is also possible to obtain grey levels in a pixel by controlling the intensity of the falling flow by variation of the voltage at the terminals of the pixel. For a given value of this varying voltage, the result within a given pixel is one fraction of its surface in texture T and the other fraction in texture U. To another value of the varying voltage, and therefore of this falling flow, there corresponds a different ratio between the areas occupied by the two textures U and T. Grey levels are thus obtained [9].

The fact that the switching is directly associated with the intensity of the flow near one of the plates 10 and 20 is a special characteristic of the BiNem displays, and the conventional TN and STN displays do not switch by this principle.

Addressing

The 3 addressing modes developed for the standard liquid crystals (direct, multiplexed, and active) can be employed for the BiNem display. The most common mode for addressing the BiNem display is multiplexed passive addressing, but active addressing with the aid of transistors in thin layers is also possible [7]. In the active and passive multiplexed modes, the BiNem display is a matrix-type screen formed of n times m picture elements called pixels, with n being the number of lines and m the number of columns, and the addressing is effected line by line.

In the multiplexed passive mode, each pixel is composed of the intersection of a line conducting strip 52 and a column-conducting strip 50. These perpendicular strips are deposited respectively on the master 20 and slave 10 plates (see FIG. 3). The zone located between two adjacent conducting strips carried by a given substrate 11 or 21 is called the interpixel space. The zone composed of all of the pixels is called the matrix zone. Customarily, in the prior art, the matrix zone is the display zone, the zone in which the content of the image to be viewed is displayed.

Outside of the matrix zone, the aforementioned conducting strips 50, 52 take the form of tracks 54, 56 which create the connection to the control circuits, called drivers, located on flexible connection elements welded to the screen for example. To display the coordinate pixel (n, m) we apply a line signal to line n and a column signal to column m.

Figure 4:
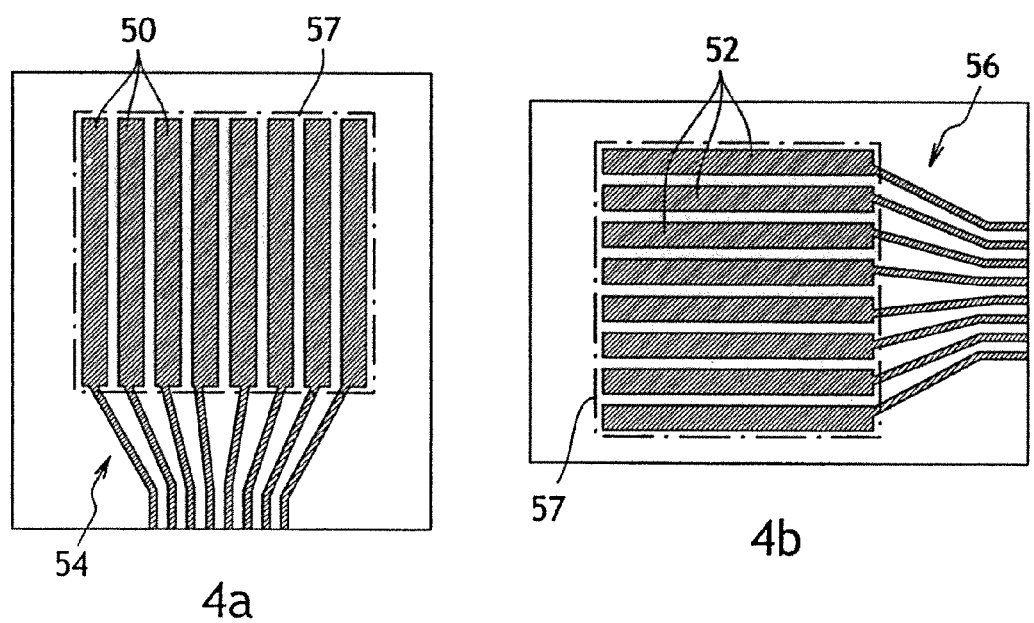

A principles diagram of the electrodes formed on the two glass substrates 11 and 21 of a conventional display according to the prior art is illustrated in FIG. 4. In general, the conducting electrodes are created with a transparent conducting material called ITO (a tin-doped indium oxide). But when the display is reflective, the electrodes located on the side opposite to the observer can be created from an opaque conducting material, such as aluminium. In order to execute the electrodes, a thin conducting layer is deposited on the two substrates 11 and 21 and then etched to the required design. FIG. 4a illustrates the mask used to etch the electrodes 50 on the so-called upper substrate 21, which in our example holds the columns. FIG. 4b illustrates the mask used to etch the electrodes 52 on the so-called lower substrate 11, which in our example hold the lines. In FIGS. 4a and 4b, we have thus referenced as 50 the strips forming the column electrodes, and as 52 the strips forming the line electrodes (these strips are used for addressing the appropriate zone), and then 54 and 56 the tracks used for connection of the aforementioned strips 50 and 52 to the drivers. The limits of the matrix zone correspond to the frame, shown by mixed line and referenced 57 in FIGS. 4a and 4b. The two zones 57 illustrated in FIGS. 4a and 4b are superimposed during assembly and sealing of the cell.

In the active addressing mode, in general any of the substrates carries a matrix of electrodes consisting of individualised and isolated pixels, arranged in a network organised into lines and columns, while on the other substrate, the electrode can be continuous. The latter is customarily held at a constant potential which we will call the reference potential. The electrical control signal is brought respectively to each pixel electrode of the first substrate by very thin conducting tracks. The latter are placed along the lines and the columns on the same substrate. They cross each other without making contact. Near the intersection of each line track and each column track, an active element, such as a transistor, is positioned. In this case, the line track is usually connected to the control terminal of the transistor, with the electrode of the pixel and the column track being connected to the other two main terminals of the transistor.

Control of a BiNem Display in Multiplexed Mode

Figure 3:
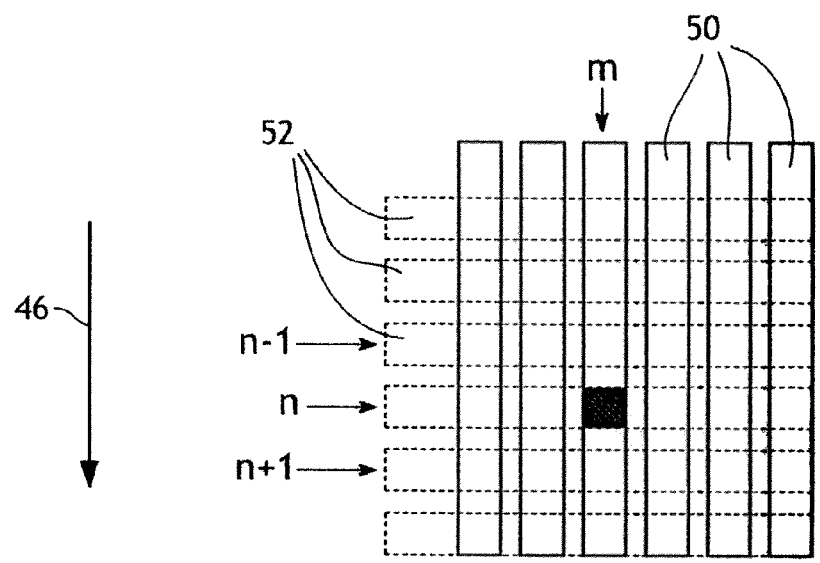

When the structure of the display is a matrix, as described previously, the addressing is effected line by line. When it is necessary to address a given line (n), an electrical signal is applied to this line, which is then described as "activated". We will call this activation signal VL. For the BiNem, we distinguish between two phases during activation, in which the first phase essentially consists of obtaining a break in the anchorage, meaning the homeotropic texture on the line concerned, by applying a voltage V1 to the line signal for example, which then constitutes a first level of VL. During the second phase, a signal V2 is applied to the line, such that $V2 \leq V1$ say, which then constitutes a second level of VL, and electrical so-called "data" signals, denoted Vc, are simultaneously applied to all the columns. The falling edge of the data signal Vc is synchronised with the falling edge of the second level of the line activation signal [1]. Depending on the amplitude and/or the shape and/or the length of the signal Vc applied to each of the columns, the texture U or T is obtained in the pixel corresponding to the intersection of this column and the activated line [6]. Then the following line is activated in its turn, the other lines being non-activated, and so on from the first to the last line of the display. The time between the end of activation of a line and the start of activation of the next line is called the interline time $t_L$. This time is typically between 50 μs and 10 ms. The magnitude of this time is very important to obtain clean switching, and varies substantially with temperature. In any case, time $t_L$>0. We will call this addressing method "single-step addressing". The order of activation of the lines (first n−1, then n, then n+1, etc.) determines the scanning direction 46 (FIG. 3).

Document [9], describing the creation of grey levels, specifies three variants for obtaining grey levels (FIG. 23 of document [9]). A first variant consists of varying the amplitude of the column signal Vc applied to the pixel P. A second variant consists of varying the length of the column signal Vc applied to the pixel P. In these two variants, the falling edge of the column signal is synchronised with the falling edge of the second level of the line signal. A third variant, called "phase modulation", consists of varying the synchronisation of the column signal Vc with the falling edge of the second level of the line activation signal.

One of the major differences to be noted between the passive mode and the active mode is that in the multiplexed passive mode, when a line p is not activated, each of the pixels of this line p is subject to the column signals corresponding to the data of the other pixels of its column, applied during the activation of the line to which they belong. In other words, when line n of pixel P(n,m) is activated by a signal VL(n), and when a signal Vc(m) is sent to column m of this pixel in order to generate the pixel signal Vp=VL(n)−Vc(m), all the pixels of column m are simultaneously subjected to Vc(m). In active addressing, during the activation of a line, the column signals are applied only to the pixels of this line. The transistors of the non-activated lines are non-conducting, and their pixels receive no signal.

According to a preferred known but non-limiting control method, prior to line-by-line addressing, we achieve complete addressing of the screen or at least part of the screen in a given texture, usually T, in a collective manner, by simultaneously activating all the lines or a group of lines. The lines are then addressed one by one, according to the conventional multiplexing method, to display the preferred image. This "two-steps addressing" is used in order to control the switching of the pixels more effectively, in particular for controlling the grey levels, since in this way the pixels start from a well-defined state at the beginning of the second step.

According to a preferred known but non-limiting embodiment of a BiNem display, the brushing direction of the alignment layers is orthogonal to the direction of the lines of the display, this type of display being described as "with orthogonal brushing".

Limitations Exhibited by the BiNem Displays Created According to the Prior Art

Figure 5:
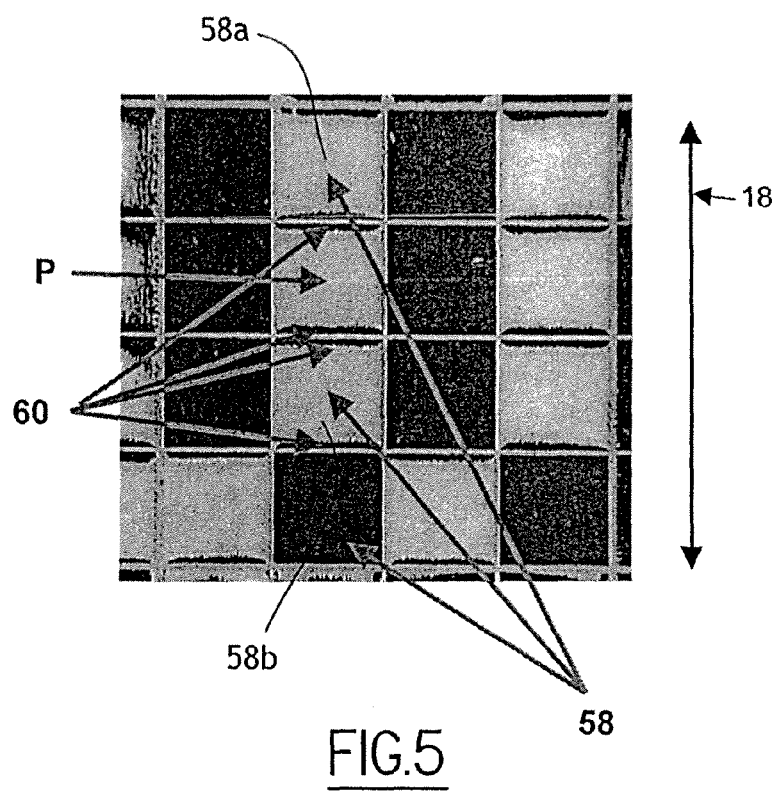

The inventors have observed that use of the flow to effect the switching of a pixel P has as a consequence that the switching of the pixel P is also sensitive to the flows created in the adjacent pixels during the addressing method, where these flows diffuse in the pixel to be switched. The interaction of these flows, due to the adjacent pixels, with the intrinsic flow of pixel P interferes with the switching of pixel P. The adjacent pixels of P are defined as the pixels which are liable to interfere with its switching through their flows, and so are the pixels 58 located on either side of pixel P in the flow direction 18 (FIG. 5). When the brushing direction 40 is orthogonal to the lines, the flow direction 18 is generally parallel to the brushing direction. The adjacent pixels to the flow direction are the pixels located on either side of P, on its column m.

When the brushing direction is indeterminate, the adjacent pixels are those located on either side of P, according to the flow direction, which is generally parallel (to within ±10°) to the brushing direction.

When we consider all of the pixels on a line n, all of their neighbours, whatever the brushing direction, are located on the lines adjacent to line n, which is upstream of lines n−1, n−2 . . . and downstream of lines n+1, n+2 . . . . We then speak of lines adjacent line n (in the flow direction).

One Example of Interference by Neighbours is the "Edge Effect".

During addressing of the BiNem displays, on two of the edges of the pixels to be switched to texture T, a field can appear which switches to U. This fault is clear in FIG. 5, on pixels switched to T. At these pixels, pixel P for example, it can be seen that their edges 60 perpendicular to brushing, and therefore to the direction of the flows 18, have switched to U instead of switching to T. In FIG. 5, the pixels switched to T are illustrated in light shading, while the pixels switched to U are illustrated in dark shading.

After lengthy analysis, the inventors have determined that these faults are explained by the fact that the flow created by the return to equilibrium of the molecules near the master plate 20 is braked at the upstream edge and at the downstream edge of pixel P. The departure of the liquid upstream of the flow in pixel P creates low pressure in the preceding adjacent pixel 58a. Its arrival downstream creates an added pressure in the following adjacent pixel 58b. These two effects generally break the flow in all of pixel P. But they are particularly important at the aforementioned two edges 60 of pixel P, wherever the engine of the flow stops. Just at the edges 60 of pixel P, the speed can be twice as weak as at the centre of the latter. In these conditions the edge 60 of pixel P can never switch to T, whatever the voltage step-down of the signal on this pixel.

Figure 6:
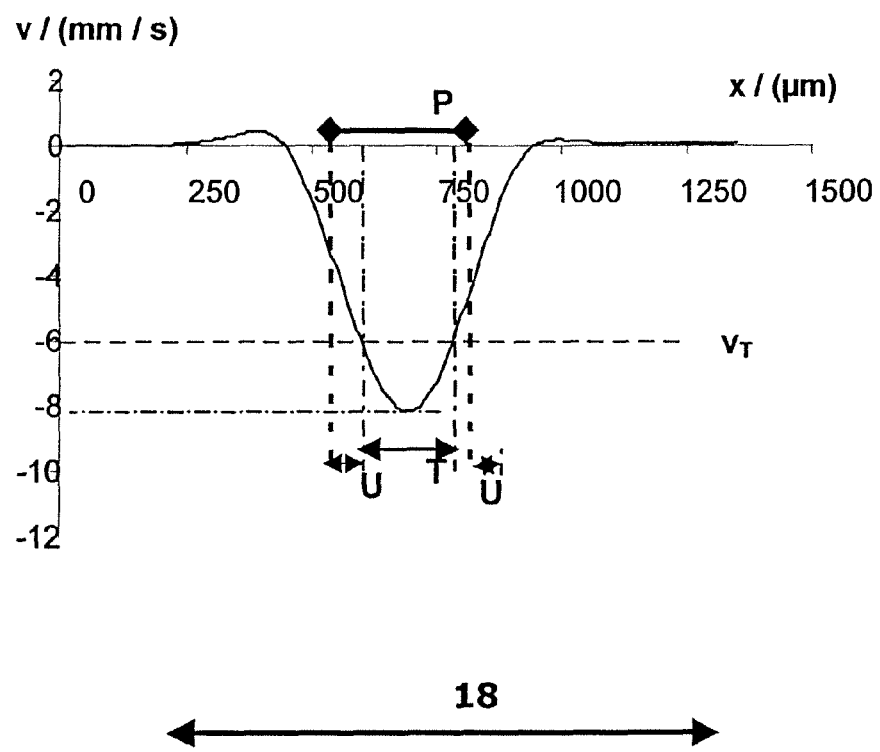

FIG. 6 explains this phenomenon. It presents, as a function of x (which corresponds to an abscissa parallel to direction 18), the average in z (the axis perpendicular to the plates 11 and 21—see FIG. 2) of the speed according to x (average speed) of the falling flow on switch-off of a slot-type signal, applied to pixel P, with an amplitude Vp=20 Volts. No other signal is applied to the display. The negative value of the speed indicates a falling flow in the opposite direction to x, and therefore in direction 16 (FIG. 2). In FIG. 6, $V_T$ represents the minimum speed of the falling flow which is necessary for switching to T. In FIG. 6 we see that at the edges of P located in direction 18, the absolute value of the speed v of the falling flow is less than $V_T$. These edges therefore switch to U.

DESCRIPTION OF THE INVENTION

The purpose of this present invention is to overcome the aforementioned drawbacks observed during embodiment of the displays known from the prior art.

This objective is attained in the context of the present invention using a method for the control of a liquid crystal display including a matrix of pixels arranged in crossed lines and columns, and in which a switching of state of the liquid crystal molecules, controlled by application of an electrical control signal between two electrodes framing each pixel, generates a flow in a particular direction close to the brushing direction, the addressing of the pixels being carried out by line-by-line addressing either in one step or in two steps constituted by a first step in which collective addressing is done on at least part of the screen in a given unique texture, followed by a second line-by-line addressing step, characterised in that, in order to control the switching of at least some of the pixels, it comprises a step which consists of applying, to at least one adjacent pixel, in the flow direction, of a pixel whereof the switching is to be controlled by the electrical control signal, auxiliary electrical signals whereof the rising or falling edges are temporally placed in advance of or in coincidence relative to the active rising edge of the electrical control signal with temporal offset of between 0 and a few tens of microseconds, at ambient temperature, so as to favour the switching of said pixel to be controlled, said auxiliary electrical signals being applied during the second step when the addressing is in two steps.

According to another characteristic of the invention, said auxiliary electrical signals applied to at least one adjacent pixel, are designed to induce in said adjacent pixel, an auxiliary flow parallel to said general determined direction used to control the switching of the pixel to be controlled.

According to another advantageous characteristic of this present invention, the temporal shift of an edge of the auxiliary electrical signals relative to the active falling edge of the electrical control signal is between 0 and a few tens of µs at ambient temperature, typically between 0 and 50 µs, preferably between 0 and 10 µs, and very preferably between 5 µs and 10 µs.

This present invention also concerns the liquid crystal displays used to implement the aforesaid method.

In order to control the switching of a pixel P, the invention thus essentially consists of applying, to one or more pixels located on one or other side or on either side of pixel P, in the flow direction 18 (adjacent pixels 58), auxiliary electrical signals at a well-defined instant relative to the signal for the switching of P. The movement of the molecules created by these auxiliary electrical signals in the adjacent pixels induces in pixel P an auxiliary flow which is used to control the switching of pixel P.

The auxiliary signal can be sent to the adjacent pixels by means of the line electrodes or the column electrodes or both electrode types.

The auxiliary electrical signal applied to an adjacent pixel preferably but non-limitingly has the shape of a monopolar or bipolar slot. As will be seen later, as it rises (rising edge characterised by an increase in absolute value of the voltage), it induces a strong flow which favours the passage to U of the pixel, which switches on condition that this rising edge is applied at the right instant relative to the pixel signal. On its descent (falling edge characterised by a reduction in absolute value of the voltage), it induces a weaker flow but one which is sufficient to help the passage to T of the pixel, which again switches on condition that this falling edge is applied at the right instant relative to the pixel signal.

In the case of a passive matrix-type display, at the moment of addressing a line, the column signal is applied to all the pixels of each column. In the case of orthogonal brushing, the pixels of the column m are the adjacent pixels 58 as defined previously for pixel P(n,m). The auxiliary signal can then be supplied by a signal on column m, correctly placed in time. It can be useful however to control the amplitude of the auxiliary signal by also applying a signal to the adjacent lines of the activated line.

An auxiliary signal can also be applied to the adjacent pixels 58 by applying a signal to the lines corresponding to these adjacent pixels (lines n−1, n−2, n+1, n+2, etc.).

In the case of an active matrix-type display with orthogonal brushing, the invention is easier to implement than for passive addressing, in that the auxiliary signal can be applied only to the necessary adjacent lines independently of the switching signal, since the lines are open individually.

ADVANTAGES OF THE INVENTION

A first advantage of using auxiliary electric signals according to the present invention is the increase in the addressing speed of a screen by decreasing the time given over to addressing of each line.

A second advantage of the present invention is decreasing or even making negative the addressing time between each line.

A third advantage of the present invention is improved control of the proportion of each texture in the same pixel when a level of grey in this pixel is to be created in this manner.

Figure 7:
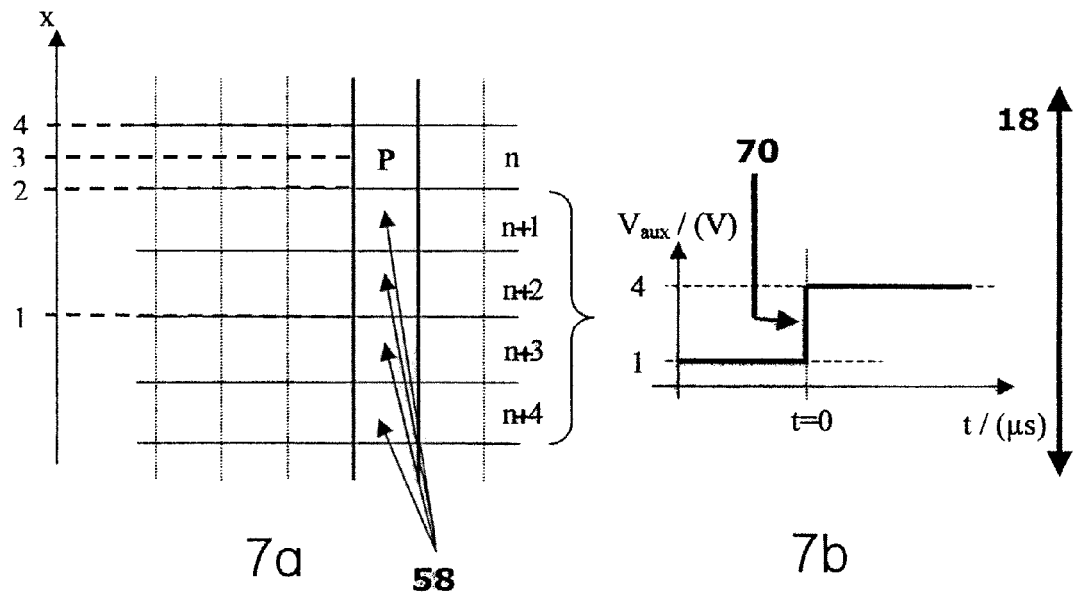
Figure 8:
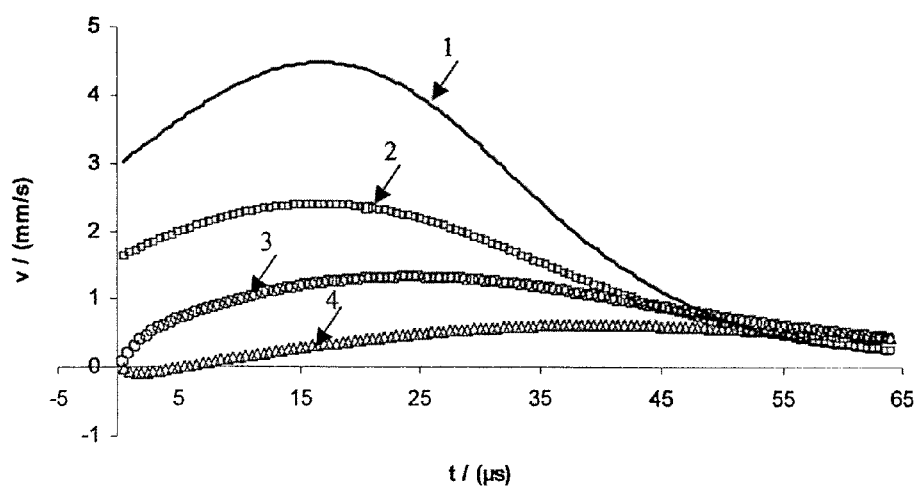
Figure 9:
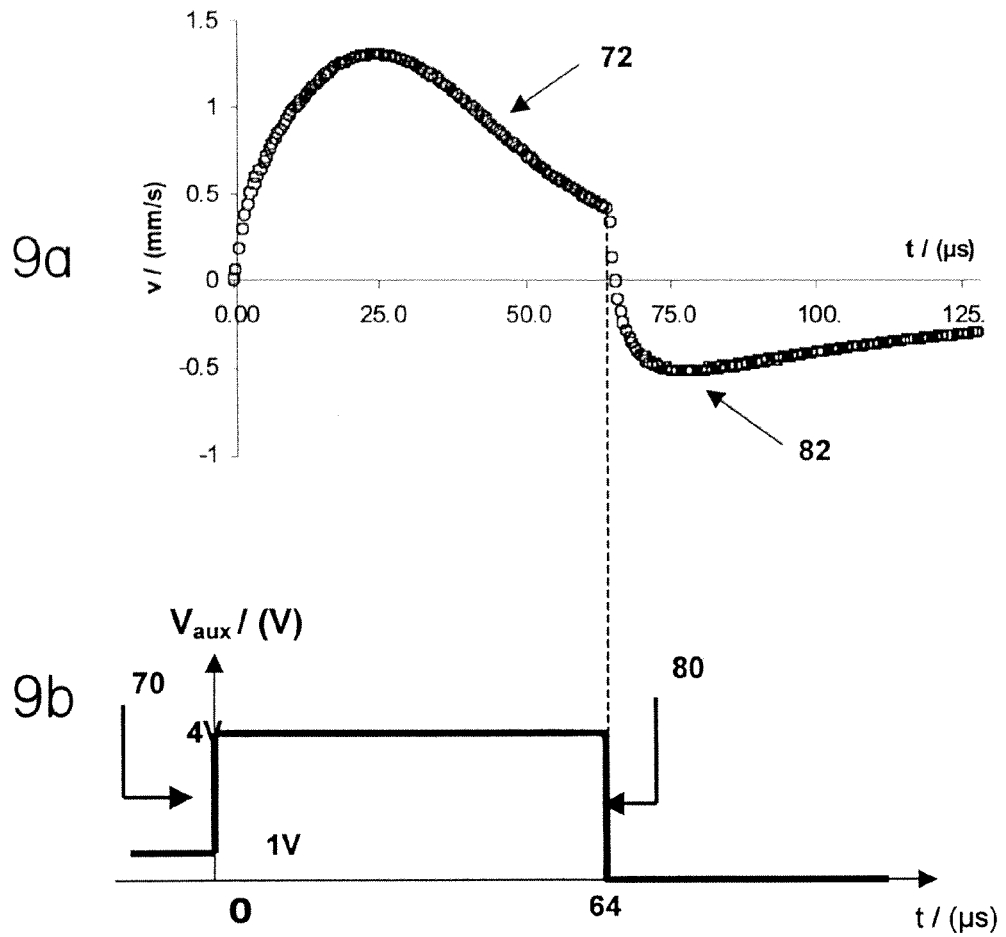
Figure 10:
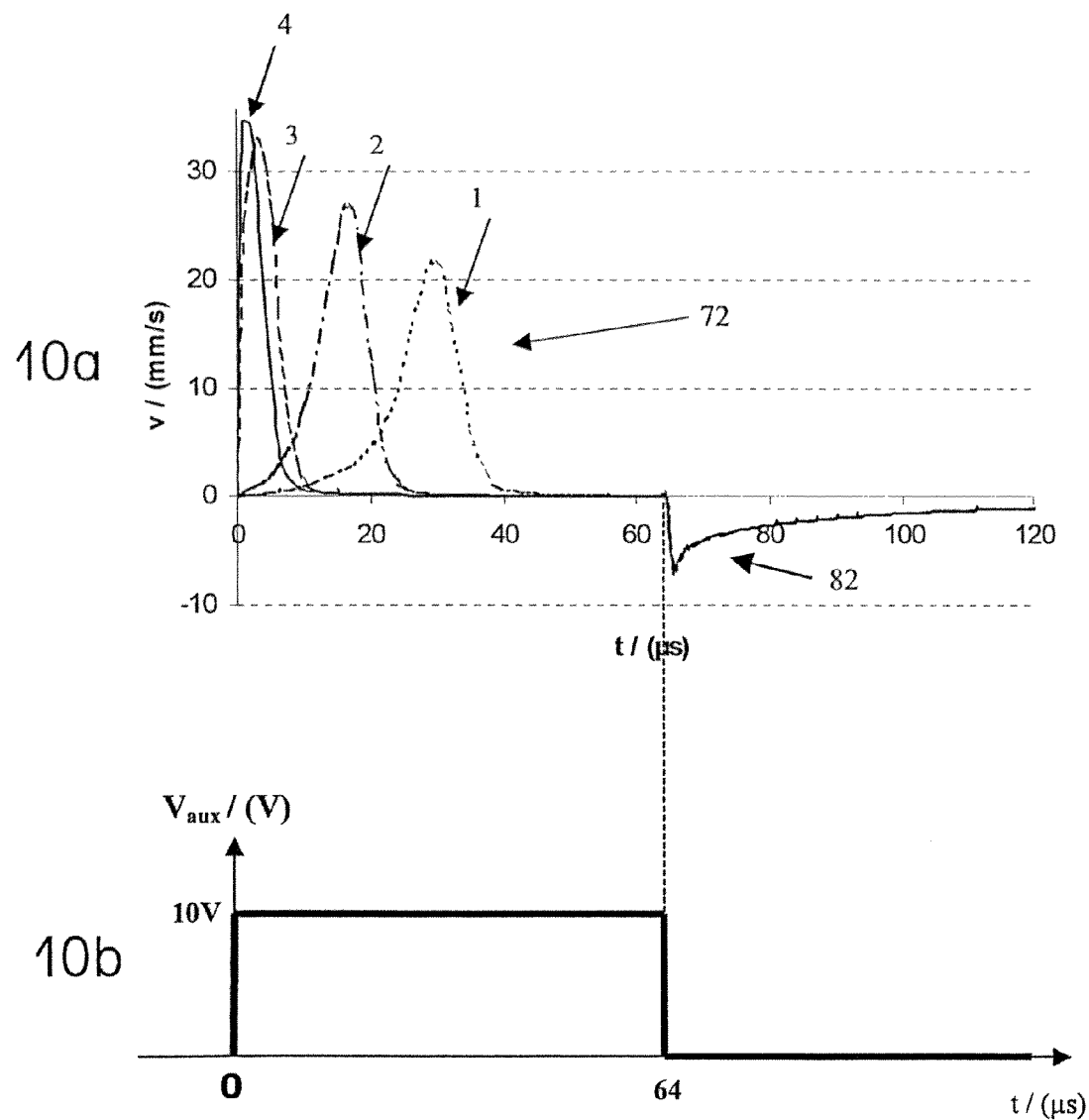
Figure 11:
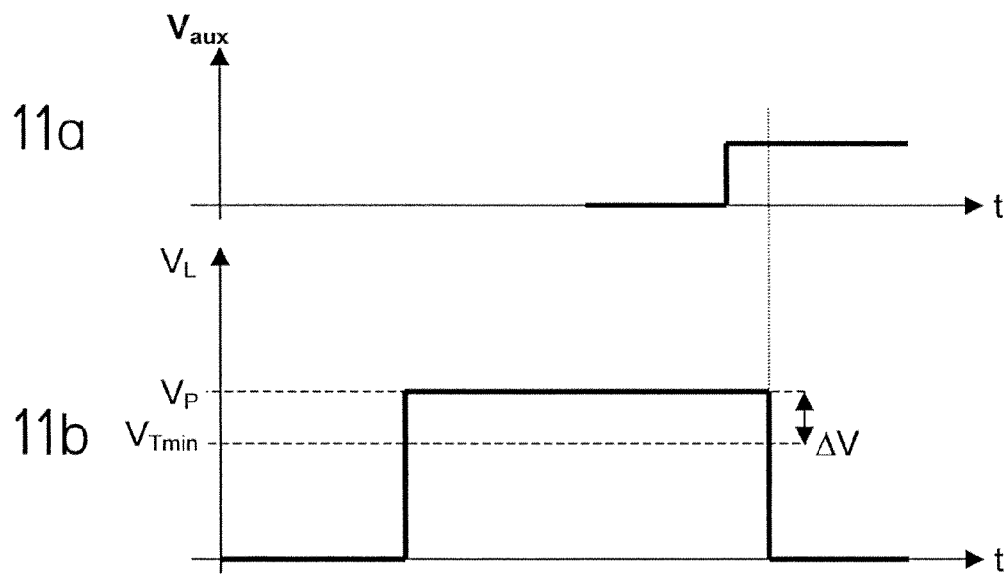
Figure 12:
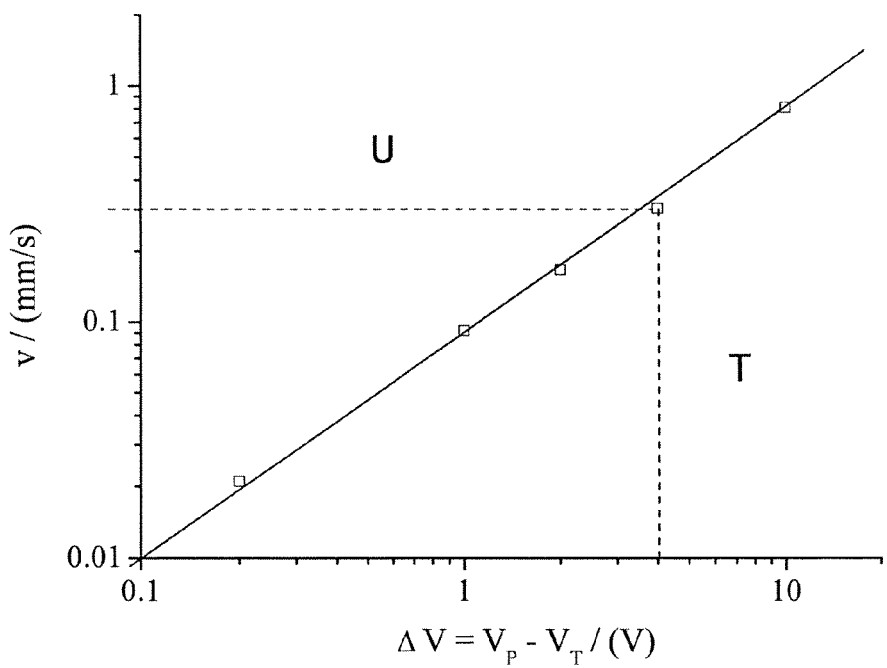

Other characteristics, aims and advantages of this present invention will appear on reading the detailed description which follows, and by referring to the appended drawings, which are provided by way of non-limiting examples and in which:

FIG. 1 shows the known operating principle of a bistable display of the BiNem type, FIG. 2 represents the falling flow used for passage to texture T in such a display, FIG. 3 illustrates the principle of conventional multiplexed passive addressing, FIG. 4 illustrates the known principles diagram of electrodes formed on the two glass substrates of a display, while FIG. 4a illustrates a mask used to etch the electrodes on the so-called upper substrate, and FIG. 4b illustrates the mask used to etch the electrodes on the so-called lower substrate, FIG. 5 illustrates the presence of an edge effect (texture U) observed on a conventional display during the switching of pixels to texture T, FIG. 6 presents the average in z of the speed according to x (average speed v) as a function of x, of the falling flow on switch-off of a slot signal applied to a pixel P, of amplitude $V_P$=20 Volts, FIG. 7 indicates, in FIG. 7a, the different positions 1, 2, 3 and 4 for which the simulations presented in FIG. 8 are effected for an auxiliary signal applied as represented in FIG. 7b, FIG. 8 presents the variation of the average speed v (average in z of the speed according to x) of the liquid crystal as a function of time, at the 4 positions 1, 2, 3 and 4 referenced in FIG. 7a, FIG. 9 shows, as a function of time, in FIG. 9a, the average speed v induced in the middle of a pixel P by a auxiliary slot signal Vaux illustrated in FIG. 9b, FIG. 10 shows, in FIG. 10a, the average speed v in the middle of the adjacent pixels, as a function of time, for several values of the root-mean-squared voltage Vrms applied to the adjacent pixels before the application of the auxiliary voltage illustrated in FIG. 10b, FIG. 11 illustrates, in FIG. 11a, an auxiliary rising signal in the form of a small slot signal of a few volts applied to the adjacent pixels via the corresponding lines a few us before the descent of the switching signal Vp applied to pixel P via its line only, and illustrated in FIG. 11b, FIG. 12 shows the amplitude of the auxiliary flow preventing the passage to T at the voltage step-down of Vp to 0. The diagram is drawn for falls of voltage greater than ΔV, to the minimum fall of $V_T$ inducing passage to T with no auxiliary flow. The auxiliary flow is generated by the auxiliary rising signal represented in FIG. 11.

Figure 13:
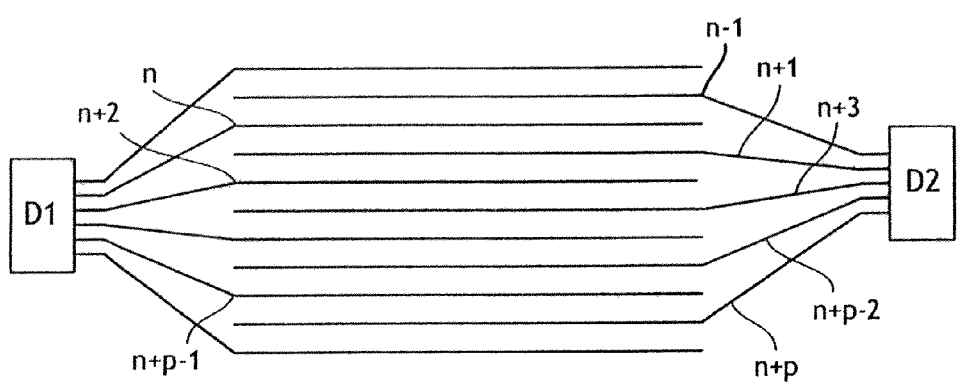
Figure 14:
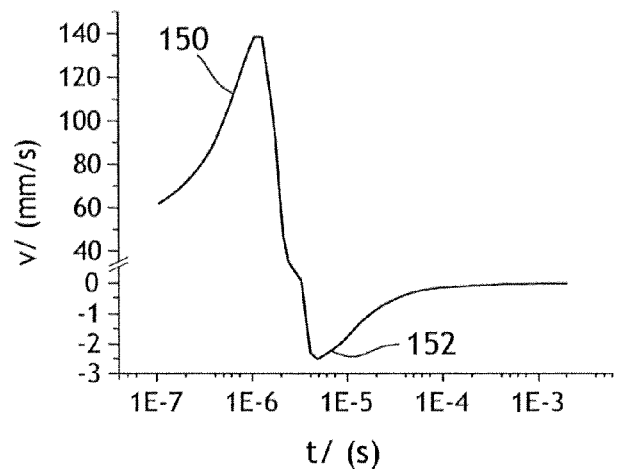

FIG. 13 schematically illustrates a variant embodiment according to the present invention, exploiting two feed circuits or "drivers" which control interlaced electrode lines, FIG. 14 shows the average speed in the middle of the pixel P as a function of time during rising by an echelon of 20 Volts, and it is noted that the positive rise flow is followed by a negative return flow, while the electric field remains applied and thus the lifted molecules practically no longer turn.

Figure 15:
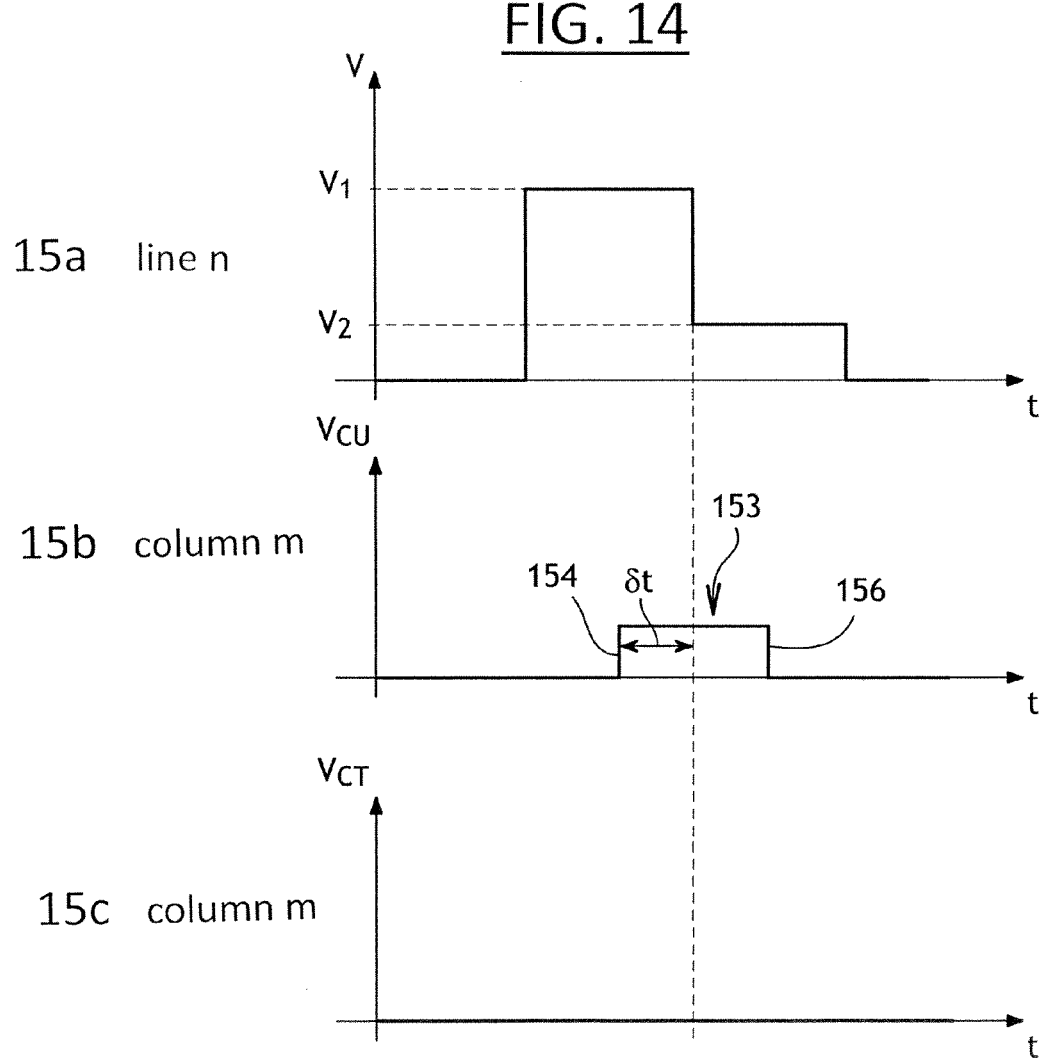
Figure 16:
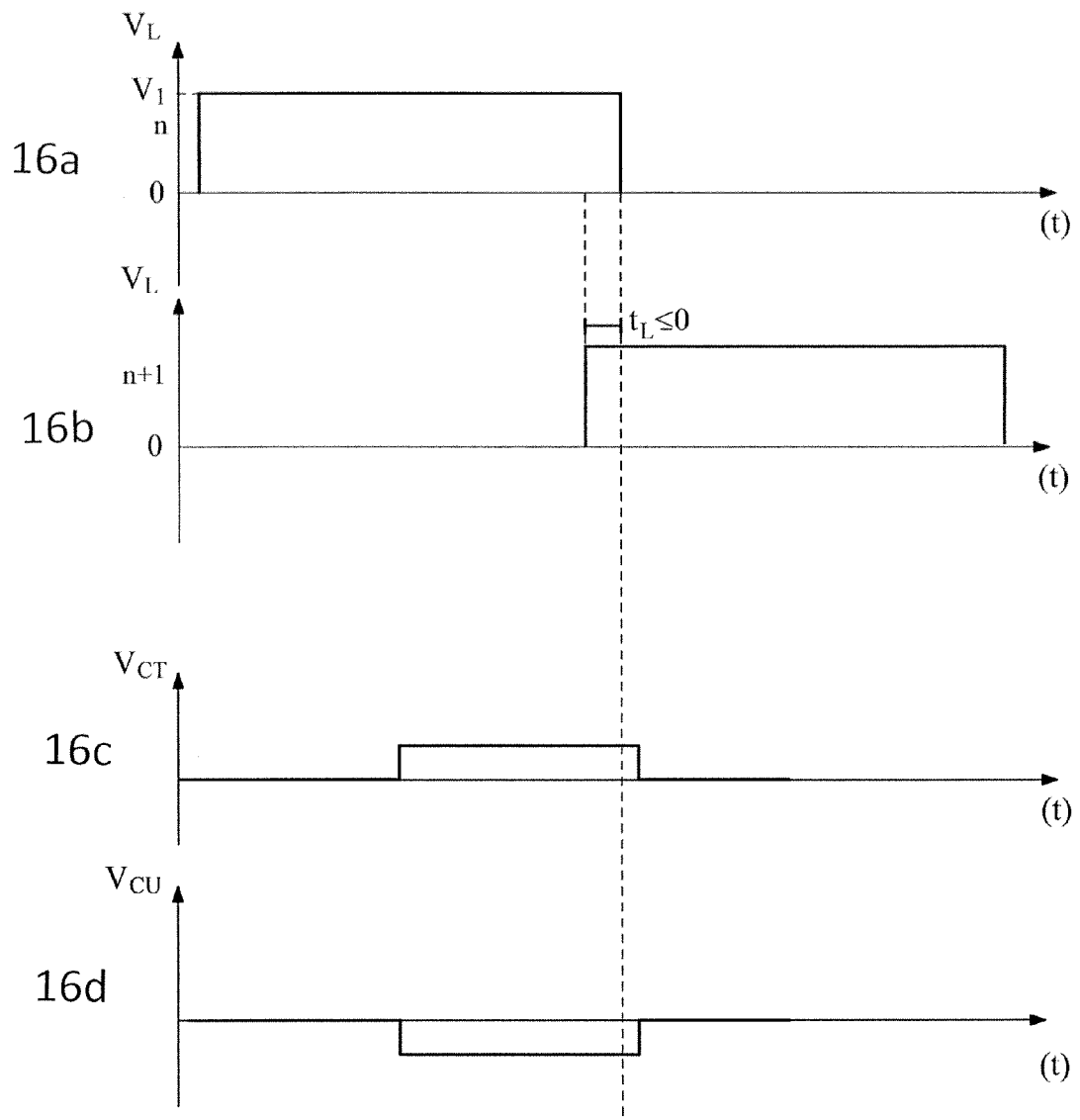
Figure 17:
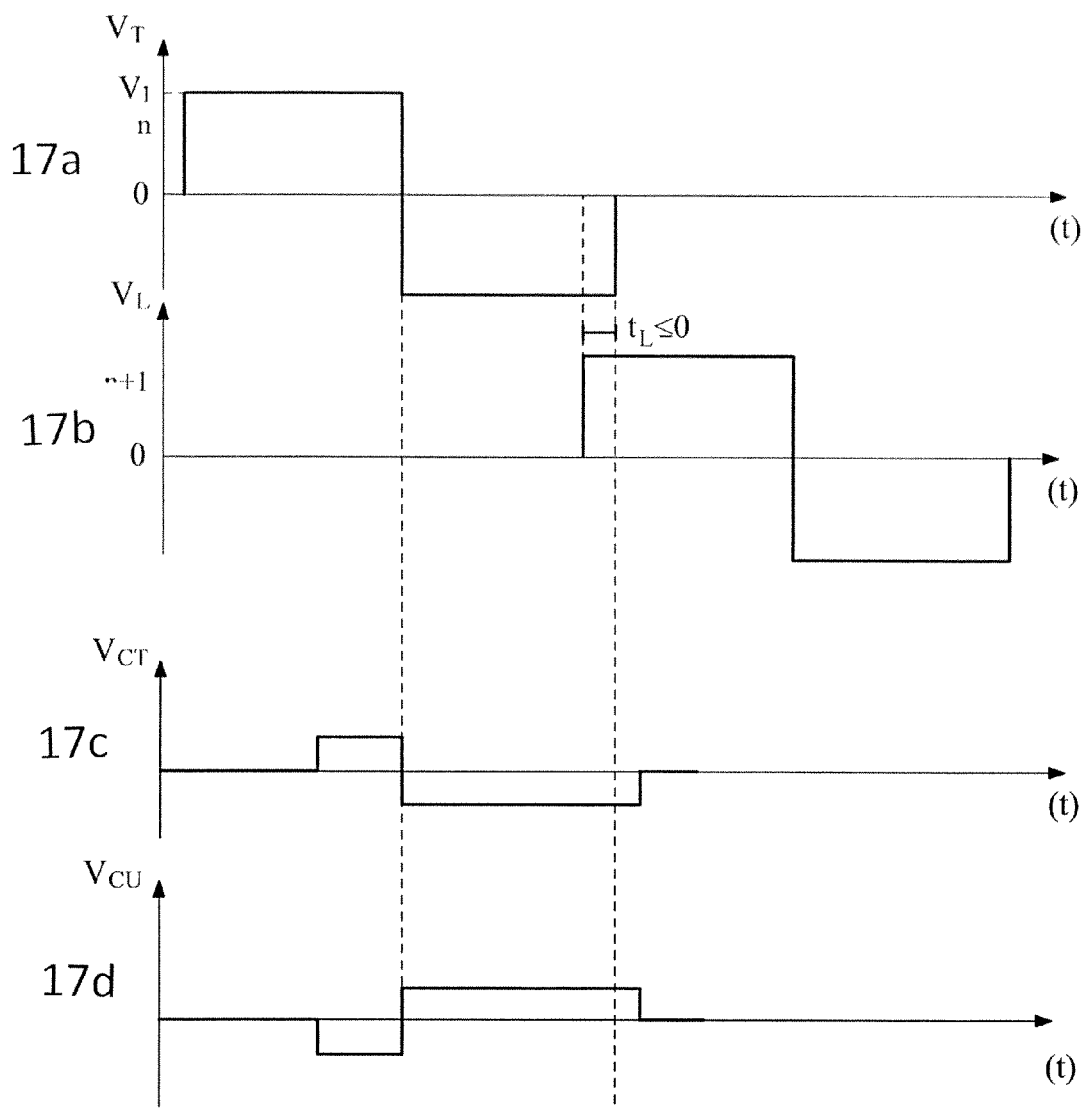

FIG. 15 illustrates in FIG. 15a the line signals and respectively in FIGS. 15b and 15c the column signals for generating switching to U or to T, corresponding to a third example of the invention, to be described hereinbelow, FIG. 16 illustrates in FIGS. 16a and 16b line signals applied to lines n and n+1, and illustrates in FIGS. 16c and 16d column signals corresponding to a fourth example of the invention in the case of monopolar line and column signals, FIG. 17 illustrates in FIGS. 17a and 17b line signals applied to lines n and n+1 and in FIGS. 17c and 17d illustrates column signals corresponding to the same fourth example of the invention in the case of bipolar lines and column signals.

DETAILED DESCRIPTION OF THE INVENTION

The studies conducted by the inventors, based on the invention, will now be explained, before presenting different examples of embodiments of the latter.

Study of the Flow Originating from the Adjacent Pixels

We are first going to explain the manner in which a flow originating from an adjacent pixel, or an auxiliary flow, diffuses into a pixel to be switched, starting with an example of pixels which are firstly all placed in state T.

a) Effect of the Distance

FIG. 8 shows, as a function of time, the average in z of the speed according to x of the liquid crystal v at four points of a cell, with these four points being referenced in FIG. 7a. This flow is created by an auxiliary signal Vaux formed from a step of 3 volts added to a constant signal of 1 volt, as illustrated in FIG. 7b. The step is simultaneously applied to 4 adjacent pixels 58 contiguous with pixel P located on line n, in a cell of 1.5 μm in thickness (FIG. 7) via the corresponding lines (n+1 to n+4). In FIG. 8, curve 1 gives the average speed at a distance sufficiently distant from pixel P, for example at a distance of 2.5 pixels relative to the centre of pixel P on the side of the four adjacent pixels receiving the auxiliary signal.

Curve 2 gives the average speed at the edge of pixel P, located on the side of the adjacent pixels receiving the auxiliary signal. Curve 3 gives the average speed in the middle of pixel P. Curve 4 gives the average speed of the liquid crystal at the edge of pixel P, located on the side opposite to the adjacent pixels receiving the auxiliary signal. FIG. 8 is the result of the numerical simulations.

In pixel P, there thus appears an auxiliary step flow according to x induced by the step of the adjacent pixels under the action of the rise in auxiliary signal 70 (rising edge). This flow attenuates as it moves away from its source, and diffuses into pixel P from the adjacent pixels in which it is generated.

b) Effect of the Fall-Off

In the same manner, on the sudden switch-off of the auxiliary signal (falling edge), an auxiliary falling flow is generated. FIG. 9a shows, as a function of time, the average speed v induced in the middle of pixel P by an auxiliary slot signal Vaux applied to the aforementioned four adjacent pixels. The slot signal of 4 volts forming the auxiliary signal is applied for 64 μs to the aforementioned adjacent pixels raised beforehand by a signal of 1 volt as illustrated in FIG. 9b.

Pixel P first experiences a positive auxiliary step flow 72 (according to x) triggered by the rise 70 of the auxiliary signal, and then an auxiliary negative falling flow 82 triggered by the sudden fall-off 80 of the auxiliary signal. The speed induced at the moment of the removal of the auxiliary signal is lower in absolute value and of opposite sign (according to −x) at the speed induced on the step.

c) Effect of the Starting State of the Adjacent Pixels

FIG. 10a shows the average speed in the middle of the adjacent pixels as a function of time for several values of the root-mean-squared voltage Vrms applied to the adjacent pixels before application of the auxiliary signal illustrated in FIG. 10b (curve 1: Vrms=0 V; curve 2: Vrms=0.7 V; curve 3: Vrms=1 V; curve 4 Vrms=1.4 V). The auxiliary signal, as illustrated in FIG. 10b, is a slot signal of 10V and with a length of 64 μs, applied to the four adjacent pixels 58 as previously. The average voltage Vrms applied before the auxiliary signal has applied a preliminary step to the molecules. This step is a function of the value of Vrms.

It is observed that, depending on Vrms, the amplitude of the average speed of the auxiliary step flow 72 at the centre of the adjacent pixels varies, but especially that the instant of the maximum of this speed is shifted substantially. To use the auxiliary step flow 72 effectively, it is necessary to take account of this phenomenon, and therefore to adjust the temporal shift between the rise 70 of the auxiliary signal and the switching signal of pixel P.

It is also observed that the average speed of the auxiliary falling flow 82 is not dependent upon Vrms.

(d) Direction of the Effect of the Auxiliary Flow

The auxiliary step flow, provoked by the rising edge of the auxiliary signal, is positive (according to x) and therefore in the opposite direction to the falling flow 32 near the master plate 20 in pixel P (according to −x), and this falling flow alone would induce passage to T of the latter. The auxiliary step flow of the adjacent pixels opposes the falling flow, and therefore favours passage to U of pixel P.

The auxiliary falling flow provoked by the falling edge of the auxiliary signal is negative (according to −x), and therefore in the same direction as the falling flow 32 of pixel P, and this falling flow alone would induce passage to T of the latter. The auxiliary falling flow of the adjacent pixels therefore aids the passage to T of pixel P.

e) Example of the Effectiveness of the Auxiliary Flow

FIG. 12 shows the amplitude of the auxiliary step flow preventing the passage to T of pixel P, while the fall from Vp to 0 is greater by ΔV than the fall necessary for passage to T with no auxiliary signal $V_{Tmin}$. On this curve, the effectiveness of the auxiliary signal is evident. Here $V_{Tmin}$=16 V. For $V_P$=20 V, ΔV=4V. The curve in FIG. 12 indicates a speed of 0.3 mm/s to stop passage to T. In FIG. 6, we saw that a voltage step-down Vp of 20 V creates a flow of −8 mm/s. The latter is thus countered by an auxiliary flow of 0.3 mm/s.

Thus, the rising edge of the auxiliary signal placed in advance (by 0 or even a few µs to a few tens of µs at ambient temperature and by a few tens to hundreds of µs in the cold) relative to the active falling edge of signal Vp is used to prevent passage to T and therefore to obtain texture U. The active falling edge of Vp here is that intended to generate a sufficient falling flow 32 to obtain texture T.

In general, adjustment of the instant of the rising or falling edges of the auxiliary signal relative to the active falling edge of signal Vp (intended to choose the texture) allows to control the final texture over all of pixel P.

When, at the start, all the pixels are in state U, phenomena of same type exist, but will not be described in detail here in order not to complicate the presentation.

The present invention offers many advantages. Though not limiting in any way, the following advantages can be mentioned:
1) during the second step of passive addressing in two steps the invention accelerates the second step and controls levels of grey.
2) during addressing in one step line by line of a set of lines (addressing one step) the invention controls switching in U or in T of the pixels of the activated line.
3) during the second step of passive display in two steps, the first step consisting of collective passing to T, the invention permits rapid switching as per an original mode using a pixel signal which does not break the anchorage for the pixels remaining in T.

In following up on this explanation we will develop three typical and non-limiting examples of executing the invention.

These examples illustrate the advantages of the invention via three of its applications in the particular case of the BINEM® display. Its application is not limited to these instances, nor to this type of display. In fact, it should be emphasised that using the auxiliary flow created by the adjacent pixels both upstream and downstream revealed within the scope of the present invention, can be useful to accelerate multiplex switching of liquid crystal displays of any type when the latter is braked by the flows.

Example 1 of Embodiment of the Invention

In Passive Addressing Acceleration of the Second Step of Addressing in Two Steps and Control of the Levels of Grey Either a screen or a few lines of a passive multiplex matrix screen, addressed in two steps. The lines 52 are perpendicular to the brushing, thus perpendicular to the flows induced by movement of the molecules (orthogonal brushing). In reference to the second step of the display: the screen has been placed in texture T by the first step in the zone 100 to be switched. Switching is done on the line n. Switching of the pixel P (line n, column m) is studied.

At the start of the resulting switching, here by way of example of a voltage slot applied to a line n, lifting the molecules from the line n causes displacement of the liquid crystal by more than 100 nm. In the configuration of molecules illustrated in FIGS. 2 and 7, displacement is towards the positive x. This displacement creates near the line n−1 overpressure and near the line n+1 negative pressure. Once the state H is reached, the pressure gradient created brings back the liquid crystal. FIG. 14 shows the average speed in the middle milieu of the pixel P as a function of the time during rising by an increment of 20 V applied to the pixel P at the instant t=0. FIG. 14 shows at 150 the rising flow and at 152 the return flow. At the outset considerable positive speed is noticed. After a few microseconds the flow becomes negative. Its effect dies away only after several hundreds of microseconds. Throughout this time, said return flow 152 inclines the molecules near the slave plate 10 in the direction of passing to texture T (negative according to −x as per our conventions): the texture U is impossible to obtain.

A slow and imperfect method of switching, without using the invention, consists of waiting for the end of the return flow 152 under voltage, which means enlarging the first level V1 of the pixel switching signal Vp (Vp=VL−Vc) at around more than 1 ms at ambient temperature. Next, a fall cut into two equivalent descents by an intermediate level will give the texture U. A descent cut into two dissymmetrical descents will give the texture T. The value of the second level on the different pixels is adjusted using the column signal Vc whereof the falling edge is synchronised with the falling edge of the second level V2 of the signal line [6]. As a function of the value of V2, the active falling edge is either the transition V1 to V2, or the transition V2 to 0. The time of the first level is critical. If it is too short the texture U exhibits parasite states T in the middle of the pixel. If it is too long, the texture T exhibits the edge defects in U already mentioned.

Carrying out the invention eliminates the above defects. For this, a classic but more rapid signal to two levels is applied to the line n: a first level of amplitude V1 strong enough to break the anchorage, over time just necessary for this breakage (typically<1 ms), then a second level V2 of amplitude lower than the breakage. Here we select by way of example the case where the active falling edge is passage V1 to V2

To switch the pixel P(n,m) to T no column signal (VcT=0) is applied to it (cf FIG. 15*c*) during the activation time of its line n. The return flow 152 aids the falling flow of the molecules of the master plate 20 with V1 to V2 passage to switch the molecules near the slave plate 10 to the state T, without any defect on the two edges. V1 to V2 passage is the active falling edge for switching of the pixel P.

To switch the pixel P(n,m) to U, an auxiliary slot signal 153 $V_c$u which lifts the molecules from the adjacent pixels (similarly for column m) located on the lines n+1, n+2, n−1, n−2 etc. . . . (cf FIG. 15*b*) is applied to its column m. The rising auxiliary edge 154 of this signal 153 is adjusted temporally so that the flow auxiliary created is maximum at the moment of V1 to V2 drop of the signal line. The rising auxiliary edge 154 of the auxiliary signal 153 is thus in advance of a time δt on the active falling edge of the pixel P (passage from V1 to V2) to compensate the delay between the auxiliary signal 153 and the flow it causes in the line n (cf FIGS. 7 and 10). The auxiliary flow at the same time opposes the return flow and the drop flow of the molecules of the master plate 20: even if the applied auxiliary voltage is less than the breakage voltage so as not to risk switching the adjacent pixels of the lines n−1, n−2 . . . already recorded, the auxiliary flow compensates the return flow and the drop flow, and allows switching to U of the pixel P. In fact, the adjacent pixels in T contribute mainly to the auxiliary flow, and these are thus the adjacent pixels n+1, n+2 . . . put into T by the first step of addressing and optionally the pixels n−1, n−2 according to their state after activation of their line. But the contribution of n+1, n+2 . . . is sufficient to produce the expected effect.

In this non-limiting example it is noted that the auxiliary signal 153 is applied only by means of the column signal. A variant would consist of also controlling the auxiliary flow by a supplementary signal line applied to the lines n+1, n+2. The column signal 153 applied in this mechanism according to the invention does not play the classic role of controlling switching of the pixel P by changing the voltage jump at its terminals [1] [2] [6], as the column signal 153 according to the invention is applied such that its falling edge 156 is synchronised with the falling edge of the second level V2 of the signal line, or desynchronised relative to this falling edge of the second level of the signal line, according to the "modulation de phase" variant of document [9]. According to the invention, it is not the falling edge 156 of the column signal 153 which plays a role, but its rising edge 154, this auxiliary rising edge 154 being placed in advance relative to the active falling edge corresponding to the V1 to V2 drop. Also, the level V2 can even be cancelled, the falling edge V1 to 0 then becoming the active falling edge. In this configuration according to the invention, the column signal 153 received by the pixel P during the activation time from its line is thus not the classic "pixel" signal but an auxiliary signal which acts on the flow of adjacent pixels and non directly on P.

Also, the inventors have shown that their invention controls a display in levels of grey simply by varying the amplitude or the temporal placement of the auxiliary signal 153. In fact, the auxiliary flow created by the pixels in T of the lines n+1, n+2, etc. is not uniform over the pixel of the line n. It is attenuated by moving away from the pixels which created it (cf FIG. 8). For a column voltage Vc of between 0 and the value $V_{cU}$ indicated earlier, the auxiliary flow is sufficient at the edge of the line n near the line n+1 to oppose the return flow and the drop flow and to ensure that the speed close to the slave plate 10 is less than the threshold passage speed in T. This part of the pixel switches to U. On the contrary, in the part of the pixel of the line n near the line n−1, the auxiliary flow is too weak to oppose the two others, the speed close to the slave plate 10 is greater than the threshold and this part of the pixel switches to T. The result is coexistence of the two textures in the pixel, shared in two parts on either side of the line where the speed, close to the slave plate 10, is equal to the threshold speed switching to T. The place of the separation line is controlled by the speed of the auxiliary flow at the time of the $V_1$ to $V_2$ drop, and is adjustable by changing the amplitude of the auxiliary signal 153 or the temporal place of its rising edge 154.

Example 2 of Embodiment of the Invention

Controlling Switching to U or T of the Pixels of the Line Activated During Line-by-Line Addressing (in One Step) in Passive Addressing To undertake line-by-line addressing, according to the invention auxiliary signals applied to the adjacent pixels are used, and adjusted to consider their state (U, T or coexistence of both textures). A constraint is that the adjacent pixels located on the lines already recorded (n−1, n−2 . . . ) must not change state, and the auxiliary signal applied to these adjacent pixels must thus low in amplitude, that is, at least less than the breakage voltage. On the contrary, an auxiliary signal of strong amplitude can be applied to the lines along the line n to be recorded (lines not yet recorded with the new image, n+1, n+2 . . . ).

It is accordingly possible with an auxiliary signal line to lift then relax the molecules corresponding to the preceding lines and following the line n to be recorded, and use their rise and fall flow, that is, the rising or falling edges of the auxiliary signal, to produce pixels respectively in U and in T on the line n, by applying an adequate column signal to the pixel P, this signal also able to be an auxiliary signal (see example 1).

Example 3 of Embodiment of the Invention

Rapid Addressing in Two Steps Using a Pixel Signal which does not break the anchorage for changing to T of Pixels that should Remain in T In using the auxiliary flows of the adjacent pixels, the inventors have brought to light another variant of a rapid display process in black and white which saves on power.

This is a method in two steps. During the first step, the part of the screen to be displayed is put uniformly in T.

During the second step the display is composed line after line and the line activation signals can be simple slots. The amplitude V1 of the line activation signal VL is slightly less than the breakage value $V_{cass}$ of the anchorage on the slave surface 10. The chronogram of these signals is shown in FIG. 16:

To change the pixel P(n, m) to U, the breakage is produced by a negative slot column signal illustrated in FIG. 16d: Vp=VL−Vc>$V_{cass}$. In this variant, it is not necessary for the falling edge of the column signal to be synchronised with the falling edge of the signal line. It can be either synchronised or located after the falling edge of the signal line.

The rising edge of the signal of the line n+1 (FIG. 16b) is placed just before the falling edge of the signal of the line n (FIG. 16a). This rising edge plays a dual role: that of lifting the molecules of the line n+1 to prepare recording of the latter and that of creating via the same method, due to adjustment of the instant where it is placed, the necessary flow auxiliary in the pixel P. At the time of the falling edge of the signal of the line n (FIG. 16a), the auxiliary flow received from the line n+1 (FIG. 16b) compensates the fall flow and the return flow of the pixel P. The rising edge of the signal of the line n+1 is the rising auxiliary edge, favouring switching to U.

To change the pixel P to T (n, m), the column signal is a positive slot illustrated in FIG. 16c. The breakage of the anchorage is not attained as Vp=VL−Vc<$V_{cass}$ and since V1 is already less than the breakage voltage. At the time of the falling edge of the line n (FIG. 16a), despite the auxiliary flow created by the rising of the molecules of the line n+1 (FIG. 16b), the molecules near the slave plate 10, attracted by the former fall back into their starting position because the anchorage has not been broken. The pixel P remains recorded in T.

The column signal illustrated in FIGS. 16c and 16d has its rising edge which precedes the falling edge of the signal line n by a few microseconds to a few hundreds of microseconds and has its falling edge synchronised or placed after the falling edge of the signal line n.

This process utilises simple signals: a single level of voltage line of amplitude V1 weaker than the breakage voltage. It is rapid because there is no need to wait under voltage for the end of the return flow compensated by the auxiliary flow. The time line approaches the breakage time, or even becomes equal thereto, typically by a few microseconds at ambient temperature. The displays controlled this way have no parasite edge effects.

The rising edge of the signal of the line n+1 (see FIG. 16b) or rising auxiliary edge must be placed in advance relative to the falling edge of the signal of the line n (see FIG. 16a) to compensate the diffusion time of the auxiliary flow from the line n+1 as far as the line n. This offset must be adjusted according to the width of the lines and the viscosity of the liquid crystal, thus its temperature.

To avoid parasite phenomena of electrolysis or polarisation of electrodes, it can be useful to replace the monopolar slotted signals illustrated in FIG. 16 with bipolar signals such as those illustrated in FIG. 17. Scrutiny of the latter shows that if the second slot of the signal line is negative, the polarity of the column signals must be inverse relative to FIG. 16 (that is, negative second column slot to produce a state T and positive second column slot to produce a state U).

With respect to FIG. 13, a variant execution according to the present invention using two circuits or "drivers" D1 and D2, which control interlaced electrode lines, will now be described.

The inventors propose in fact within the scope of the present invention, as illustrated in FIG. 13, using at least two standard drivers D1 and D2 arranged, in their link with the line electrodes, to ensure interlaced line addressing associated with a specific addressing process: at the "design" level of the electrodes of the display, the lines of the same parity (pair or impair) are connected to a driver D1 and the lines of the other parity are connected to another driver D2 for example situated to the other side of the display zone relative to D1, such as shown in FIG. 13. Thus, two adjacent lines n and n+1 are not connected to the same driver but to two different drivers.

With this process the two drivers standards D1 and D2 are used to simultaneously apply VL and Vaux to the adequate lines. This variant of the present invention enables optimal execution with standard and economical drivers.

If the above example is to be operated with standard drivers of STN type having only one offset register, it is necessary to use a control mode with interlaced lines, as mentioned previously with respect to FIG. 13. In fact, when the driver has only one offset register, line signal activation can be triggered simultaneously or successively one line after the other only. This mode is therefore not compatible with application of the line signals such as described previously with respect to FIGS. 16 and 17. To rectify this difficulty, the inventors consequently propose the use of the "design" of the electrodes with interlaced lines such as described with respect to FIG. 13. With use of this design, two adjacent lines n and n+1 are not connected to the same driver but to two different drivers. This arrangement decorrelates activation of one line (done for example by the driver D1) from that of its adjacent line (done for example by the driver D2), and thus enables temporal overlapping of the activation signal of a line n with that of its adjacent line n+1.

According to another advantageous characteristic of the invention, to control switching of at least one display line in a selected state, typically in a twisted state T, the auxiliary electric signal is a signal applied to at least one adjacent line, the amplitude of which is less than the anchorage breaking voltage and whereof the falling edge is placed in coincidence with or in advance of a time controlled relative to the active falling edge of the electric control signal.

According to another variant in keeping with the present invention, to control switching of at least one display line in a selected state, typically in a twisted state T, the auxiliary electric signal is a signal applied to several adjacent lines, the amplitude of which is less than the anchorage breaking voltage and whereof the falling edge is placed in coincidence with or in advance of a time controlled relative to the active falling edge of the electric control signal.

Naturally, this present invention is not limited to the embodiments which have just been described, but extends to any variant which complies with its spirit.

It will be noted in particular that the interlaced-line addressing method, described previously, is compatible with all variants which comply with the spirit of the invention.

For all of the signals described for this invention, the line and column signals can be either monopolar or bipolar, as described in document [6] for example. The reference voltage is not necessarily equal to 0 volts, and some screen drivers will work with a virtual earth.

All of the examples described can be combined together.

The preceding examples can be applied to active addressing, with greater freedom due to the independence of the column signals applied to the pixels of a given column but with different lines.

DOCUMENTS MENTIONED

Doc [1]: U.S. Pat. No. 6,327,017
Doc [2]: I. Dozov et al, "Recent improvements of bistable nematic displays switched by anchoring breaking (BiNem)", Proceeding SID 2001, p 224-227
Doc [3]: P. Martinot Lagarde et al, SPIE vol. 5003 (2003), p 25-34
Doc [4]: M. Giocondo, I. Lelidis, I. Dozov, G. Durand, Eur. Phys. J.AP5, 227 (1999)
Doc [5]: I. Dozov, Ph. Martinot-Lagarde, Phys. Rev. E., 58, 7442 (1998).
Doc [6]: FR 2 835 644
Doc [7]: US 2006-0022919
Doc [8]: U.S. Pat. No. 7,067,180
Doc [9]: WO 2004/104980

The invention claimed is:

1. A method for control of a nematic bistable liquid crystal display implementing a breaking of anchorage and an active addressing mode, said display including two stable liquid crystal textures, one of these two textures being a uniform or slightly twisted (U) in which liquid crystal molecules are substantially parallel to each other, and the second texture (T) differing from the first texture by a twist of about +/−180° to within +/−15° and said display including a matrix of pixels arranged in crossed lines and columns, said lines being associated with an index n and said columns being associated with an index m, each pixel (P, n, m) situated at an intersection of a line n and a column m, and in which a switching of state of the liquid crystal molecules of a pixel P to a given texture which is one of (i) a uniform or slightly twisted texture (U), and (ii) twisted texture (T), or a combination of the two textures U and T leading to a level of grey, is controlled by application of an electrical control signal between two electrodes (50, 52) framing each pixel, the electrical control signal comprising a voltage greater than a voltage for breaking the anchorage and then an active falling edge to obtain the given texture, and said switching generates a flow of liquid crystal molecules in a particular direction (18) close to a brushing direction (40), the brushing direction of the display being orthogonal to the lines, addressing of the pixels being operated in two stages made up of a first stage in which addressing of at least part of the display in a unique twisted texture (T) is collectively carried out and then a second stage in which addressing of said part of the screen is carried out line by line, wherein to control the switching of at least some of the pixels (P, n, m), said method comprises applying to at least one pixel (58) adjacent in a flow direction of a second pixel (P, n, m) wherein the switching is controlled by the electrical control signal, the adjacent pixel (n+1, m) being on the same column m as the second pixel (P, n, m) to switch and on the next line, auxiliary electrical signals corresponding to signals applied onto the electrode of column m suitable to induce in the adjacent pixel an auxiliary flow parallel to said direction (18), said auxiliary signals being applied during the second stage of addressing the line n of the second pixel (P, n, m) to switch to the given texture, amplitude of the auxiliary electrical signals being less than the breakage voltage and wherein rising or falling edges are temporally placed in advance of or in coincidence relative to active falling edge of the electrical control signal, of the second pixel P with temporal offset of between 0 and 50 microseconds, at ambient temperature, so as to favor the switching of said second pixel to be controlled to the given texture.

2. The method as claimed in claim 1, wherein said auxiliary electrical signals are applied simultaneously to at least two adjacent pixels (58).

3. The method as claimed in claim 1, wherein said auxiliary electrical signals applied to at least one adjacent pixel (58) are signals applied between a line electrode and a column electrode of said at least one adjacent pixel (58).

4. The method as claimed in claim 1, wherein said auxiliary electrical signals applied to at least one adjacent pixel (58) are monopolar signals.

5. The method as claimed in claim 1, wherein said auxiliary electrical signals applied to at least one adjacent pixel (58) are bipolar signals.

6. The method as claimed in claim 1, wherein to favor switching of a pixel (P) to a uniform or slightly twisted state (U), the rising edge of the auxiliary electrical signals is placed temporally in advance relative to the active falling edge of the electrical control signal.

7. The method as claimed in claim 1, wherein to favor switching of a pixel (P) to a twisted state (T), the falling edge of the auxiliary electrical signals is place temporally in coincidence or in advance relative to the active falling edge of the electrical control signal.

8. The method as claimed in claim 1, wherein the temporal shift of an edge of the auxiliary electrical signals relative to the active falling edge of the electrical control signal is between 0 and 10 μs.

9. The method defined in claim 1, wherein during the second stage of addressing in two stages a control signal comprising two successive constant level is applied to the pixel to be controlled:
a first constant level amplitude of which is strong enough to break an anchorage followed by a second constant level amplitude of which is weaker than an anchorage breakage voltage, and the auxiliary electrical signals are applied to column electrodes in the form of a zero signal to produce the twisted state (T) and in the form of a slot signal wherein a rising edge is placed in advance relative to an intermediate active falling edge between the two constant levels of the control signal to produce the uniform or slightly twisted (U) state.

10. The process as claimed in claim 9, wherein the auxiliary electrical signal is also applied to pixels adjacent to lines not yet recorded (n+1 or n+1 et n+2) of the line to be controlled.

11. The process as claimed in claim 1, wherein levels of grey are controlled by controlling at least one of the amplitude and the temporal offset of the auxiliary electrical signals relative to the active falling edge of the electrical control signal.

12. A nematic bistable liquid crystal display implementing a breaking of anchorage and an active addressing mode, said display including two stable liquid crystal textures, one of the two textures being a uniform or slightly twisted (U) texture in which liquid crystal molecules are substantially parallel to each other, and a second texture (T) differing from the first texture by a twist of about +/−180° to within +/−15° and said display including a matrix of pixels arranged in crossed lines and columns;
said lines being associated with an index n and said columns being associated with an index m, each pixel (P, n, m) is situated at the intersection of a line n and a column m, and in which a switching of state of the liquid crystal molecules of a pixel P to a given texture which is one of (i) a uniform or slightly twisted texture (U), and (ii) a twisted texture (T) and a combination of said U and T textures leading to a level of grey, is controlled by application of an electrical control signal between two electrodes (50, 52) framing each pixel, the electrical control signal comprising a voltage greater than a voltage for breaking the anchorage and then an active falling edge to obtain the given texture, and said switching generating a flow of liquid crystal molecules in a particular direction close to the brushing direction (18) (40), the brushing direction of the display being orthogonal to the lines, the addressing of the pixels being operated in two stages made us of a first stage in which addressing of at least part of the screen in a unique twisted texture (T) is collectively carried out, and then a second stage in which addressing of said part of the screen is carried out line by line, wherein said display includes, to control the switching of at least some of the pixels (P, n, m), means applying to at least one adjacent pixel (58), in the flow direction, of a pixel (P, n, m) wherein the switching is controlled by the electrical control signal, the adjacent pixel (n+1, m) being on the same column m as the pixel (P, n, m) to switch and on the next line, auxiliary electrical signals corresponding to signals applied onto the electrode of column m suitable to induce in the adjacent pixel an auxiliary flow parallel to said direction (18), said auxiliary signals being applied during the second state of addressing the line n of the pixel (P, n, m) to switch to the given texture, wherein rising or falling edges are temporally placed in advance of or in coincidence relative to an active falling edge of the electrical control signal of the pixel P with temporal offset of between 0 and 50 microseconds at ambient temperature, so as to favor the switching of said pixel to be controlled (P) to the given texture.

* * * * *

UNITED STATES PATENT AND TRADEMARK OFFICE
CERTIFICATE OF CORRECTION

PATENT NO. : 8,405,591 B2  
APPLICATION NO. : 12/527416  
DATED : March 26, 2013  
INVENTOR(S) : Philippe Martinot-Lagarde, Stephane Joly and Jean Denis Laffitte It is certified that error appears in the above-identified patent and that said Letters Patent is hereby corrected as shown below:

In the Claims:

Column 17, Claim 9, line 44, please delete "level" and insert --levels--.

Column 17, Claim 10, line 58, please delete "et" and insert --and--.

Column 18, Claim 12, line 33, please delete "us" and insert --up--.

Signed and Sealed this  
Second Day of July, 2013

Teresa Stanek Rea  
*Acting Director of the United States Patent and Trademark Office*